United States Patent
Clark et al.

(10) Patent No.: US 10,489,738 B2
(45) Date of Patent: Nov. 26, 2019

(54) SYSTEM AND METHOD FOR FACILITATING BIDS BY DELIVERY DRIVERS ON CUSTOMER STORE ITEM DELIVERIES

(71) Applicant: Walmart Apollo, LLC, Bentonville, AR (US)

(72) Inventors: Jimmie R. Clark, Fayetteville, AR (US); Michael Lawerance Payne, Centerton, AR (US); Kevin Matthew Charles, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 208 days.

(21) Appl. No.: 15/475,323

(22) Filed: Mar. 31, 2017

(65) Prior Publication Data
US 2017/0286893 A1    Oct. 5, 2017

Related U.S. Application Data
(60) Provisional application No. 62/316,689, filed on Apr. 1, 2016.

(51) Int. Cl.
*G06Q 10/08* (2012.01)
*G06Q 10/06* (2012.01)
*G06Q 20/20* (2012.01)

(52) U.S. Cl.
CPC ... *G06Q 10/083* (2013.01); *G06Q 10/063112* (2013.01); *G06Q 20/209* (2013.01)

(58) Field of Classification Search
CPC .......... G06Q 10/083; G06Q 10/0834; G06Q 10/06311; G06Q 30/0611; G06Q 10/1097; G06Q 10/06; G06Q 10/063112
See application file for complete search history.

(56) References Cited

U.S. PATENT DOCUMENTS 4,231,439 A * 11/1980 Hall, Jr. ............... G01G 19/035
 177/1
4,605,081 A * 8/1986 Helmly, Jr. ............ G01G 19/02
 177/1

(Continued)

FOREIGN PATENT DOCUMENTS

EP          2487454 A2     8/2012
WO     2015059691 A1     4/2015
WO     2015187485 A1    12/2015

OTHER PUBLICATIONS

User's Guide to Roadnet 5000—Routing & Scheduling System Version 5.6 United Parcel Service Company, Roadnet Technologies Inc., 1996 (Year: 1996).*

(Continued)

*Primary Examiner* — Scott L Jarrett
(74) *Attorney, Agent, or Firm* — Schmeiser, Olsen & Watts LLP; Timothy P. Collins

(57) ABSTRACT

A system for delivering store items to a selected destination comprises a store computer that receives selected store item data including a delivery request; a delivery request database that stores the delivery request; and a delivery request application processor that provides a rule that includes criteria for selecting at least one delivery driver and generates a result that identifies a delivery driver of the at least one delivery driver satisfying the criteria of the generated rule.

18 Claims, 4 Drawing Sheets

(56) References Cited

U.S. PATENT DOCUMENTS

| | | | |
|---|---|---|---|
| 4,839,835 A * | 6/1989 | Hagenbuch | G08G 1/20 702/174 |
| 4,845,625 A * | 7/1989 | Stannard | G06Q 10/06 705/5 |
| 4,882,475 A * | 11/1989 | Miller | G06Q 10/087 235/383 |
| 5,122,959 A * | 6/1992 | Nathanson | G08G 1/202 340/993 |
| 6,240,362 B1 | 5/2001 | Gaspard, II | |
| 6,385,537 B2 | 5/2002 | Gaspard, II | |
| 6,411,897 B1 | 6/2002 | Gaspard, II | |
| 6,587,831 B1 * | 7/2003 | O'Brien | G06Q 10/063116 705/7.16 |
| 6,748,366 B1 * | 6/2004 | Hurwitz | G06Q 20/02 235/380 |
| 6,806,807 B2 | 10/2004 | Cayne et al. | |
| 6,823,315 B1 * | 11/2004 | Bucci | G06Q 10/06 705/7.16 |
| 6,862,572 B1 * | 3/2005 | de Sylva | G06Q 30/0205 705/7.34 |
| 6,917,924 B1 * | 7/2005 | Ramsden | G01G 19/005 705/401 |
| 6,957,188 B1 * | 10/2005 | Dellevi | G06Q 10/063112 705/7.14 |
| 6,963,861 B1 * | 11/2005 | Boucher | G06Q 30/0283 705/400 |
| 7,113,071 B2 | 9/2006 | Cayne et al. | |
| 7,251,621 B1 * | 7/2007 | Weng | G06Q 30/06 705/26.41 |
| 7,257,552 B1 | 8/2007 | Franco | |
| 7,385,529 B2 * | 6/2008 | Hersh | G06Q 10/06311 340/988 |
| 7,627,422 B2 * | 12/2009 | Adamczyk | G06Q 10/06 701/516 |
| 7,765,140 B1 * | 7/2010 | Megiddo | G06Q 30/06 705/37 |
| 7,773,773 B2 * | 8/2010 | Abercrombie | G06K 9/4633 382/104 |
| 7,828,202 B2 * | 11/2010 | Bregman | G06Q 10/087 235/376 |
| 7,840,427 B2 | 11/2010 | O'Sullivan | |
| 7,844,481 B2 * | 11/2010 | Hilbush | G06Q 10/06311 705/7.13 |
| 7,895,087 B1 * | 2/2011 | Gottlieb | G06Q 30/0601 705/26.1 |
| 7,945,469 B2 | 5/2011 | Cohen et al. | |
| 7,945,470 B1 | 5/2011 | Cohen et al. | |
| 8,126,903 B2 * | 2/2012 | Lehmann | G06Q 10/06 707/758 |
| 8,160,972 B1 | 4/2012 | Tannenbaum | |
| 8,554,694 B1 | 10/2013 | Ward et al. | |
| 8,787,707 B1 * | 7/2014 | Steves | G06Q 30/02 382/181 |
| 9,009,067 B1 * | 4/2015 | Scotto | G06Q 30/0207 705/15 |
| 9,066,206 B2 | 6/2015 | Lin et al. | |
| 9,202,191 B2 | 12/2015 | Bowen et al. | |
| 9,230,292 B2 | 1/2016 | Amin et al. | |
| 9,269,103 B1 | 2/2016 | Kumar et al. | |
| 9,305,310 B2 | 4/2016 | Radhakrishnan et al. | |
| 9,378,479 B2 | 6/2016 | Seifen | |
| 9,459,622 B2 | 10/2016 | Abhyanker | |
| 9,509,617 B1 * | 11/2016 | Malmgren | H04L 67/10 |
| 9,626,639 B2 * | 4/2017 | Gibbon | G06Q 10/06315 |
| 9,639,908 B1 | 5/2017 | Reiss et al. | |
| 9,710,779 B1 * | 7/2017 | Maloney | G06Q 10/0833 |
| 9,718,397 B2 | 8/2017 | Kalanick et al. | |
| 9,721,224 B2 | 8/2017 | Waris et al. | |
| 9,741,010 B1 * | 8/2017 | Heinla | G06Q 10/083 |
| 9,778,057 B2 | 10/2017 | O'Mahony et al. | |
| 9,792,574 B2 | 10/2017 | Lord et al. | |
| 9,805,536 B2 | 10/2017 | Lutnick et al. | |
| 9,811,838 B1 | 11/2017 | Daire et al. | |
| 9,852,551 B2 | 12/2017 | Brinig et al. | |
| 9,902,310 B2 | 2/2018 | Fournier et al. | |
| 9,904,900 B2 | 2/2018 | Cao | |
| 9,928,540 B1 | 3/2018 | Gerard et al. | |
| 9,934,530 B1 * | 4/2018 | Iacono et al. | |
| 10,133,995 B1 * | 11/2018 | Reiss | G06Q 10/063114 |
| 10,148,918 B1 * | 12/2018 | Seiger | H04N 7/183 |
| 2001/0047285 A1 * | 11/2001 | Borders | G06Q 10/06314 705/7.24 |
| 2002/0087371 A1 * | 7/2002 | Abendroth | G06Q 10/02 705/37 |
| 2002/0087377 A1 * | 7/2002 | Rajasenan | G06Q 10/06 705/2 |
| 2002/0152128 A1 * | 10/2002 | Walch | G06Q 10/08 705/26.2 |
| 2003/0040944 A1 | 2/2003 | Hileman | |
| 2003/0046173 A1 | 3/2003 | Benjier et al. | |
| 2003/0106932 A1 * | 6/2003 | Malatesta | B07C 1/00 235/375 |
| 2003/0220848 A1 | 11/2003 | Behrendt | |
| 2003/0236739 A1 * | 12/2003 | Borgeson | G06Q 10/087 705/37 |
| 2004/0034571 A1 | 2/2004 | Wood et al. | |
| 2004/0073498 A1 | 4/2004 | Napier, Jr. et al. | |
| 2004/0089482 A1 * | 5/2004 | Ramsden | G01G 19/005 177/1 |
| 2004/0210621 A1 * | 10/2004 | Antonellis | G06Q 10/087 709/200 |
| 2005/0209913 A1 * | 9/2005 | Wied | G06Q 10/08 705/12 |
| 2006/0010037 A1 * | 1/2006 | Angert | G06Q 10/087 705/15 |
| 2006/0026030 A1 | 2/2006 | Jacobs | |
| 2006/0059023 A1 | 3/2006 | Mashinsky | |
| 2006/0109964 A1 * | 5/2006 | Skelton | G06Q 30/08 379/114.02 |
| 2006/0224477 A1 * | 10/2006 | Garcia | G06Q 10/06 705/32 |
| 2007/0192111 A1 * | 8/2007 | Chasen | G06Q 10/08 705/335 |
| 2008/0040193 A1 * | 2/2008 | Dion | G06Q 10/06 705/7.14 |
| 2008/0136676 A1 * | 6/2008 | Yano | G01G 19/02 340/937 |
| 2008/0319822 A1 * | 12/2008 | LaJoie | G06Q 10/06 305/7.16 |
| 2009/0063222 A1 * | 3/2009 | Doan | G06Q 10/00 705/7.13 |
| 2009/0216600 A1 * | 8/2009 | Hill | G06Q 10/06 705/7.14 |
| 2009/0276267 A1 * | 11/2009 | Padan | G06Q 10/02 705/5 |
| 2010/0100507 A1 | 4/2010 | Davidson et al. | |
| 2011/0059693 A1 | 3/2011 | O'Sullivan | |
| 2011/0301985 A1 * | 12/2011 | Camp | G06Q 10/02 705/5 |
| 2012/0030133 A1 | 2/2012 | Rademaker | |
| 2012/0078743 A1 * | 3/2012 | Betancourt | G06Q 10/083 705/26.3 |
| 2012/0185404 A1 | 7/2012 | Koh | |
| 2012/0271592 A1 * | 10/2012 | Harres | G01G 19/002 702/173 |
| 2013/0110346 A1 * | 5/2013 | Huber | B60T 7/22 701/33.9 |
| 2013/0144763 A1 * | 6/2013 | Skyberg | G06Q 50/28 705/27.1 |
| 2013/0179362 A1 * | 7/2013 | Rhyan | G06Q 10/08345 705/335 |
| 2013/0218727 A1 * | 8/2013 | Lutnick | G06Q 30/06 705/26.81 |
| 2013/0254085 A1 * | 9/2013 | Tanimoto | G06Q 40/04 705/37 |
| 2013/0293539 A1 * | 11/2013 | Hunt | G01B 11/00 345/420 |
| 2013/0307964 A1 * | 11/2013 | Bremer | G06K 9/22 348/135 |

(56) References Cited

U.S. PATENT DOCUMENTS

| | | | |
|---|---|---|---|
| 2014/0000969 A1* | 1/2014 | Carruthers | G01G 19/12 |
| | | | 177/136 |
| 2014/0025524 A1 | 1/2014 | Sims et al. | |
| 2014/0058902 A1 | 2/2014 | Taylor et al. | |
| 2014/0104416 A1* | 4/2014 | Giordano | G01B 11/02 |
| | | | 348/135 |
| 2014/0164126 A1* | 6/2014 | Nicholas | A63F 9/24 |
| | | | 705/14.58 |
| 2014/0188750 A1* | 7/2014 | Seiler | G06Q 10/08345 |
| | | | 705/335 |
| 2014/0236856 A1 | 8/2014 | Baykhurazov | |
| 2014/0278634 A1 | 9/2014 | Horvitz et al. | |
| 2014/0278635 A1* | 9/2014 | Fulton | G06Q 10/063112 |
| | | | 705/7.14 |
| 2014/0278851 A1 | 9/2014 | Kopanati | |
| 2014/0278875 A1 | 9/2014 | Ganesh et al. | |
| 2014/0304103 A1* | 10/2014 | Barton | G06Q 10/083 |
| | | | 705/26.4 |
| 2014/0324633 A1* | 10/2014 | Pollak | G06Q 10/083 |
| | | | 705/26.63 |
| 2014/0351265 A1* | 11/2014 | Beaurepaire | G06Q 10/08 |
| | | | 707/748 |
| 2014/0379607 A1* | 12/2014 | Chousa | G06Q 10/0836 |
| | | | 705/339 |
| 2015/0025936 A1 | 1/2015 | Garel et al. | |
| 2015/0039366 A1* | 2/2015 | Haque | G06Q 10/063112 |
| | | | 705/7.14 |
| 2015/0081581 A1 | 3/2015 | Gishen | |
| 2015/0161563 A1 | 6/2015 | Mehrabi | |
| 2015/0161564 A1 | 6/2015 | Sweeney et al. | |
| 2015/0161697 A1* | 6/2015 | Jones | G06Q 30/0611 |
| | | | 705/26.4 |
| 2015/0193791 A1 | 7/2015 | Gao et al. | |
| 2015/0199569 A1* | 7/2015 | Park | G06Q 10/06 |
| | | | 382/101 |
| 2015/0199632 A1 | 7/2015 | Chander et al. | |
| 2015/0206093 A1 | 7/2015 | Trew et al. | |
| 2015/0206267 A1 | 7/2015 | Khanna et al. | |
| 2015/0227890 A1 | 8/2015 | Bednarek et al. | |
| 2015/0228004 A1* | 8/2015 | Bednarek | G06Q 30/0633 |
| | | | 705/26.8 |
| 2015/0242829 A1 | 8/2015 | Bhaskaran | |
| 2015/0262121 A1 | 9/2015 | Riel-dalpe et al. | |
| 2015/0310388 A1 | 10/2015 | Jamthe | |
| 2015/0339625 A1 | 11/2015 | Agasti et al. | |
| 2015/0347961 A1 | 12/2015 | Gillen | |
| 2015/0347964 A1* | 12/2015 | Taylor | G06Q 10/08355 |
| | | | 705/26.3 |
| 2015/0348173 A1 | 12/2015 | Gillen | |
| 2015/0363843 A1 | 12/2015 | Loppatto et al. | |
| 2016/0012391 A1* | 1/2016 | Burnett | G06Q 10/0834 |
| | | | 705/336 |
| 2016/0019669 A1 | 1/2016 | Gopalakrishnan | |
| 2016/0048804 A1 | 2/2016 | Paul et al. | |
| 2016/0071056 A1 | 3/2016 | Ellison et al. | |
| 2016/0078394 A1 | 3/2016 | Fuldner | |
| 2016/0086128 A1 | 3/2016 | Geiger et al. | |
| 2016/0189098 A1 | 3/2016 | Beaurepaire et al. | |
| 2016/0104112 A1 | 4/2016 | Gorlin | |
| 2016/0104113 A1 | 4/2016 | Gorlin | |
| 2016/0155072 A1 | 6/2016 | Prodromidis et al. | |
| 2016/0171439 A1* | 6/2016 | Ladden | G06Q 10/0832 |
| | | | 705/340 |
| 2016/0180287 A1* | 6/2016 | Chan | G06Q 10/0833 |
| | | | 705/333 |
| 2016/0195404 A1 | 7/2016 | Prasad et al. | |
| 2016/0225115 A1 | 8/2016 | Levy et al. | |
| 2016/0239789 A1* | 8/2016 | Hanks | G06Q 10/083 |
| 2016/0314429 A1* | 10/2016 | Gillen | G01S 19/13 |
| 2016/0328678 A1 | 11/2016 | Gillen | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0379167 A1 | 12/2016 | Raman | |
| 2017/0032341 A1 | 2/2017 | Johnsrud | |
| 2017/0083862 A1 | 3/2017 | Loubriel | |
| 2017/0089710 A1 | 3/2017 | Slusar | |
| 2017/0091891 A1 | 3/2017 | Van Der Berg | |
| 2017/0124510 A1 | 5/2017 | Caterino et al. | |
| 2017/0134661 A1* | 5/2017 | Chietein | B60R 1/00 |
| 2017/0140326 A1 | 5/2017 | Rhyu | |
| 2017/0286893 A1* | 10/2017 | Clark | G06Q 10/063112 |
| 2017/0310770 A1 | 10/2017 | Samaan et al. | |
| 2017/0351994 A1 | 12/2017 | Waris et al. | |
| 2018/0096414 A1 | 4/2018 | Iacono et al. | |
| 2018/0240067 A1* | 8/2018 | Oz | G06Q 10/08 |

OTHER PUBLICATIONS

Shiply, Wikipedia.com, retrieved Jan. 8, 2019 (Year: 2019).*
UShip, Wikiepdia.com, retrieved Jan. 8, 2019 (Year: 2019).*
International Preliminary Report on Patentability in PCT/US2017/025260 dated Oct. 11, 2018; 9 pages.
"EyeDeliver," Mobile App, Revention.com, accessed on Feb. 23, 2016; 4 pages.
"DR!VE Mobile Delivery," Mobile App, Granburys.com, accessed on Feb. 23, 2017; 8 pages.
Vieo-Cuong Cao "Design a mobile logistics solution utilizing modern Software and Services," Bachelor thesis, Hochschule Darmstadt, Aug. 13, 2012; 67 pages.
International Search Report and Written Opinion in International Patent Application No. PCT/US17/25260, dated Jun. 21, 2017; 10 pages.
Office Action in Canadian Patent Application No. 3,015,542 dated Jul. 9, 2019; 5 pages.

* cited by examiner

SYSTEM AND METHOD FOR FACILITATING BIDS BY DELIVERY DRIVERS ON CUSTOMER STORE ITEM DELIVERIES

RELATED APPLICATIONS

This application claims the benefit of U.S. Provisional Patent No. 62/316,689, filed Apr. 1, 2016, the contents of which are incorporated herein in its entirety.

FIELD

The present inventive concepts relate generally to the identification of delivery drivers, and more specifically, to the delivery of items purchased at a store from the store to a specified location.

BACKGROUND

A store customer often may choose not to purchase a large store item because the customer does not have the means, for example, a large car or truck, to transport the store item to the customer's home or other designated location.

BRIEF SUMMARY

In one aspect, provided is a system for delivering store items to a selected destination, comprising: a store computer that receives selected store item data including a delivery request; a delivery request database that stores the delivery request; and a delivery request application processor that provides a rule that includes criteria for selecting at least one delivery driver and generates a result that identifies a delivery driver of the at least one delivery driver satisfying the criteria of the generated rule.

In some embodiments, the system may comprise a delivery driver portal that includes a display for displaying a list of outstanding deliveries and for submitting an acceptance to the delivery request.

In some embodiments, available delivery drivers of the at least one delivery driver satisfying the criteria may submit bids from the delivery driver portal to perform a requested delivery.

In some embodiments, the system may further comprise a customer portal that includes information on a delivery driver of the at least one delivery driver satisfying the criteria, and may provide to a display a list of qualified delivery drivers for consideration to deliver the store item according to the delivery request.

In some embodiments, the system may further comprise a delivery driver database that stores a list of available delivery drivers for performing the requested delivery.

In some embodiments, the delivery request application processor may vet the list of available delivery drivers according to the rule criteria and generates a list of qualified available delivery drivers.

In some embodiments, the system may further comprise a bid processor, wherein the qualified available delivery drivers may submit from a computer a bid to perform the requested delivery.

In some embodiments, additional information about the qualified available delivery drivers may be presented to the customer for selecting a driver from the qualified available delivery drivers.

In some embodiments, the bid processor may exchange data with the rules engine, establishing that a driver submitting a lowest bid is to be awarded the job of performing a delivery in accordance with a delivery request.

In some embodiments, the delivery request application processor may automatically generate a selected delivery driver of the list of qualified available delivery drivers.

In some embodiments, the system may further comprise at least one sensor that determines at least one of a measurement a vehicle to be used by the at least one delivery driver or a measurement of a store item, and generates a result processed by the delivery request application processor.

In some embodiments, the delivery request application processor may perform a match between a customer purchases requiring delivery with a delivery driver to identify one or more delivery drivers that satisfy the criteria.

In some embodiments, the criteria includes a bid delta.

In another aspect, provided is a method for delivering store items, comprising: storing selected store item data in a data repository, the selected store item data including a delivery request; generating a rule that includes criteria for selecting at least one delivery driver; and generating a result that identifies a delivery driver of the at least one delivery driver that satisfies the criteria of the generated rule.

In some embodiments, the method may further comprises providing a customer portal that includes information on the delivery driver submitting the accepted delivery request and receives the accepted delivery request from the delivery driver portal and for accepting the delivery driver submitting the accepted delivery request.

In some embodiments, the method may further comprise storing a list of available delivery drivers for performing the requested delivery, and determining the list of available delivery drivers according to the rule criteria and generates a list of qualified available delivery drivers.

In some embodiments, the method may further comprise outputting the qualified available delivery drivers to a bid to identify available drivers to perform the requested delivery.

In some embodiments, additional information about the qualified available delivery drivers may be presented to the customer for selecting a driver from the qualified available delivery drivers.

In another aspect, provided is a delivery request application device, comprising a rules engine that stores a set of criteria, which establishes conditions for selecting at least one delivery driver; a delivery request processor that processes a delivery request made by a purchaser of a store item; a delivery factor calculator that establishes a delivery cost of the item; and driver qualification processor that generates a result that identifies a delivery driver of the at least one delivery driver satisfying the criteria of the generated rule.

In some embodiments, the delivery request application device may further comprise a bid processor that processes bids to deliver the store item under the conditions by delivery drivers of the at least one delivery driver.

In another aspect, provided is a computer system with one or more memory storage devices and one or more processors, the computer system configured to: store data related to a selected store item in a data repository of the memory storage devices, the store data including a dimension of the item; generate a rule that includes criteria for selecting at least one delivery driver; and identify a delivery driver of the at least one delivery driver satisfies the criteria of the generated rule.

BRIEF DESCRIPTION OF THE SEVERAL VIEWS OF THE DRAWINGS

The above and further advantages may be better understood by referring to the following description in conjunc

DETAILED DESCRIPTION

In brief overview, embodiments of the present inventive concepts relate to a delivery service for items from stores, member clubs, or related retail establishments by matching customer purchases requiring delivery with a delivery driver. Accordingly, customers can purchase store items otherwise not possible due to delivery constraints, thereby increasing store sales.

Figure 1:
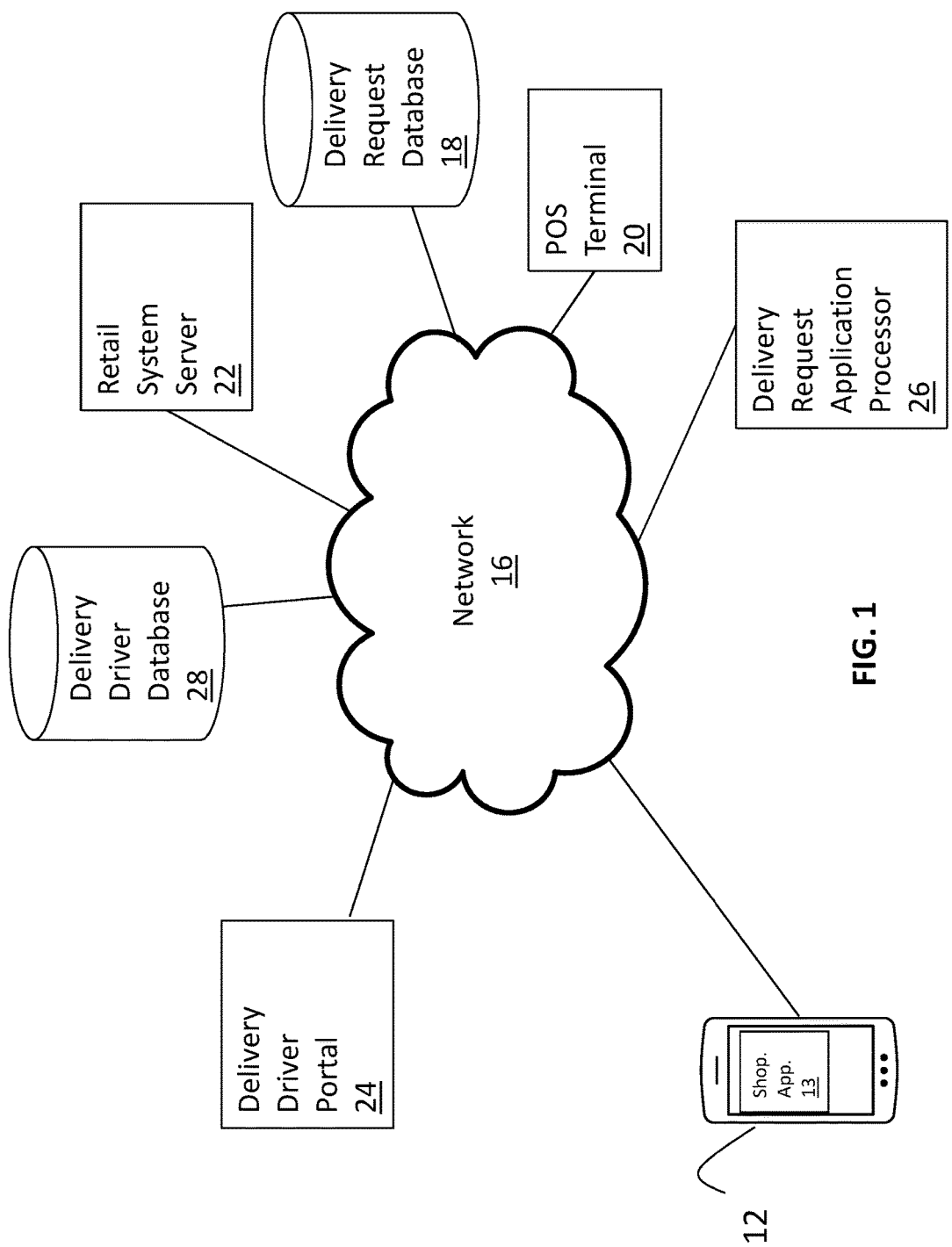
- FIG. 1 is a network diagram of an environment in which embodiments of a store item delivery system are employed.

FIG. 1 is a network diagram of an environment in which embodiments of a store item delivery system are employed.

The environment includes a communications network 16 that permits the various electronic devices of the environment to communicate with each other. The network 16 may be a public switched telephone network (PSTN), a mobile communications network, a data network, such as a local area network (LAN) or wide area network (WAN), or a combination thereof, or other communication network known to those of ordinary skill in the art.

Environment elements may include but not be limited to one or more of each of a delivery request database 18, a point of sale (POS) terminal 20, a retail system server 22, a delivery driver portal 24, a delivery request application processor 26, a delivery driver database 28, or a combination thereof, which can communicate with each other over the network 16.

In some embodiments, the environment includes a shopper's mobile electronic device 12 such as a smartphone, electronic notebook, laptop computer, and so on, at which a shopping application 13 may be executed. The shopping application 13 may include a customer portal, which can include information on delivery drivers and/or retrieve such information from an external data repository, generate and process inputs from the customer regarding feedback on shopping and delivery experiences, initiate delivery requests, and so on. In some embodiments, the customer portal may be at a different computer than the mobile electronic device 12. The customer portal may include information on the delivery driver submitting an accepted delivery request and receives the accepted delivery request from the delivery driver portal and for accepting the delivery driver submitting the accepted delivery request. For example, information about a qualified available delivery driver may be presented to the customer for making an informed decision about selecting a driver from the qualified available delivery drivers.

The POS terminal 20 provides technology for completing a retail transaction. Here, a customer may purchase store items by making a payment to a store associate or by an "express payment" or automatic payment. The POS terminal 20 may include a printer for providing invoice payment information, payment receipts, coupons for future purchases, and so on. The POS terminal 20 may be part of a system that includes other customized hardware and software for optimizing a customer checkout, including but not limited to weighing scales, scanners, electronic and manual cash registers, and/or touch screens. The POS terminal 20 may generate and output data in response to a transaction to other computer elements of the environment performing various functions, such as inventory management, customer relationship management (CRM), financial, warehousing, advertising/marketing, and so on.

The delivery request database 18 is constructed and arranged for storing delivery requests.

The delivery request application processor 26 can establish criteria for a delivery vehicle to be used in delivering store items according to customer requests. The delivery request application processor 26 can also perform a match between a customer purchases requiring delivery with a delivery driver to identify one or more delivery drivers that satisfy the predetermined criteria. The delivery request application processor 26 can also determine whether a driver is acceptable for performing the requested delivery. Accordingly, the delivery request application processor 26 can vet the list of available delivery drivers according to rule criteria and generate a list of qualified available delivery drivers. The delivery request application processor 26 may further automatically generate a result that includes a selected delivery driver of the list of qualified available delivery drivers that satisfies the criteria of a generated rule, instead of the customer selecting the delivery driver from the list. A business decision may be made whether to allow the customer to select the driver of preference from the list, or allow the customer to select a driver for a particular situation.

The retail system server 22, or store computer, may store and process shopper list items, item location information, inventory data, but is not limited thereto. The POS terminal 20 can communicate with the retail system server 22 for providing sales transaction data to the server 22, for example, to store purchase history data. The store computer 22 may also receive a delivery request with store item data.

The delivery driver portal 24 receives and processes delivery requests, which can be viewed at a portal display by prospective drivers, who may reply to the requests as candidates for fulfilling the criteria set forth in the delivery requests. In addition to accepting requests, in some embodiments, the delivery driver portal 24 may be used for drivers to bid for a delivery. The delivery driver portal 24 may display a list of outstanding deliveries regardless of whether drivers have been selected for performing the deliveries, in addition to displaying a current delivery request. People who are interested in becoming delivery drivers may register at the delivery driver portal 24. Here, an interested person may complete a questionnaire, the contents of which maybe be stored at the delivery driver database 28. A driver candidate may be required to undergo a qualification process, for example, providing a resume, completing a written and/or road test, providing references, and so on. Data related to the qualification process may be stored at the delivery driver database 28 for subsequent retrieval and review by customers, store managers, or other authorized and interested parties.

The delivery driver database 28 stores a list of available delivery drivers for performing the requested delivery. The delivery request application processor 26 can update the delivery driver database 28 with driver data received from the customer portal, the delivery driver portal 24, and/or other sources. For example, the delivery request application processor 26 may receive information from a database that a driver was recently arrested for drunk driving, or that a vehicle identification stored at the database 28 is associated with a stolen vehicle. This data can be added to a record on the driver, and stored at the delivery driver database 28.

Figure 2:
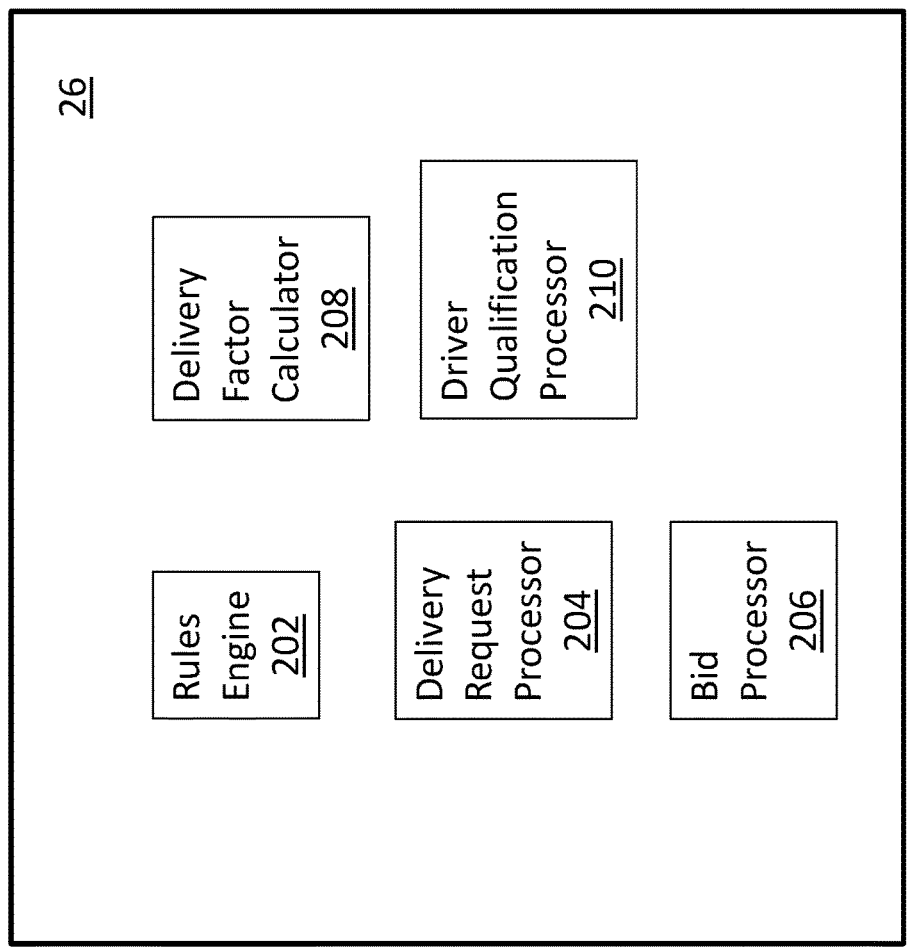
FIG. 2 is a schematic block diagram of a delivery request application processor, in accordance with some embodiments.

FIG. 2 is a schematic block diagram of a delivery request application processor 26, in accordance with some embodiments. The delivery request application processor 26 may include a rules engine 202, a delivery request processor 204, a bid processor 206, a delivery factor calculator 208, and a driver qualification processor 210. Some or all of the delivery request application processor 26 may include a rules engine 202, a delivery request processor 204, a bid processor 206, a delivery factor calculator 208, and a driver qualification processor 210 can be part of a same hardware platform. In other embodiments, the foregoing delivery request application processor elements are separate hardware devices and communicate with each other via a network 16.

The rules engine 202 stores a set of criteria, or rules, which establish conditions, for example, a type of vehicle for delivering items according to a delivery request. For example, a delivery request may be to deliver a large television set. The rules engine 202 may establish a rule that any qualified delivery driver must have a vehicle that can accommodate the dimensions of the television set, e.g., height, length, width, weight, and so on. The established rule may be applied to a comparison between a customer purchase requiring delivery with a delivery driver to determine whether the driver accepting the delivery request is acceptable.

The delivery request processor 204 processes delivery requests received from the delivery request database 18. In some embodiments, the delivery requests are parsed from store item data received at the store computer 22, and output from the store computer 22 or database 18 to the delivery request processor 204. The delivery request processor 204 can generate and send a notification to the customer, for example, the customer's mobile device 12, that a request made by the customer has been accepted. The destination of the notification may be established as part of a setup process for the customer of the delivery driver, where the customer may be asked to enter how the customer would like to be contacted (email, automated phone message, text message), along with the relevant information for that contact method. The notification may be a prerecorded or predetermined message stored at the delivery request database 18 or other data repository.

The bid processor 206 may receive bids from the driver portal 24, where available delivery drivers may submit bids to perform a requested delivery. The bid processor 206 may include a set of criteria for processing bids, for example, setting a bidding rate, such as a maximum or minimum rate, which can be set by the store customer, e.g., entered from the customer's mobile electronic device 12. The bid processor 206 may exchange data with the rules engine 202, for example, establishing that a driver submitting the lowest bid is awarded the job of performing a delivery in accordance with a delivery request. Another criteria include a bid delta, or how much a driver must underbid so that drivers do not underbid each other by some insignificant amount.

In other embodiments, a customer may circumvent the bidding process, and select the driver based on personal preference or other criteria, instead of the bid processor 206 identifying preferable bidders for delivering items.

The delivery factor calculator 208 may establish a delivery cost based on the time of day, size of delivery, distance of delivery. Drivers may be paid based on distance of the delivery, size of the item being delivered, reputation based on past deliveries, and so on. Delivery factors such as location, distance, time of year, availability of drivers, and so on may affect the delivery cost. The delivery driver may include such factors when accepting a delivery request or submitting a bid. Alternatively, the bid processor 206 may automatically consider such factors when generating bid responses, selecting a driver to perform a delivery according to a request, and so on.

The driver qualification processor 210 may vet a list of available delivery drivers and/or their vehicles according to the rule criteria established by the rules engine 202 and/or data regarding drivers from the delivery driver database 28 and/or other source in order to generate a list of qualified available delivery drivers. The driver qualification processor 210 can generate a result that identifies a delivery driver of the at least one delivery driver satisfying pre-established rule criteria, for example, a type of vehicle for delivering items according to a delivery request, or a drug-free driver, and so on. Vehicle information may be stored at the delivery driver database 28 or other portal, and include type of vehicle, dimensions for carrying items, weight capacity, and/or other relevant data that may be used to determine whether store items selected for delivery may indeed be feasibly delivered by a vehicle of interest.

The list of qualified drivers may be delivered directly to the customer portal at the customer device 12 for consideration or may be output to the bid processor 206.

Figure 3:
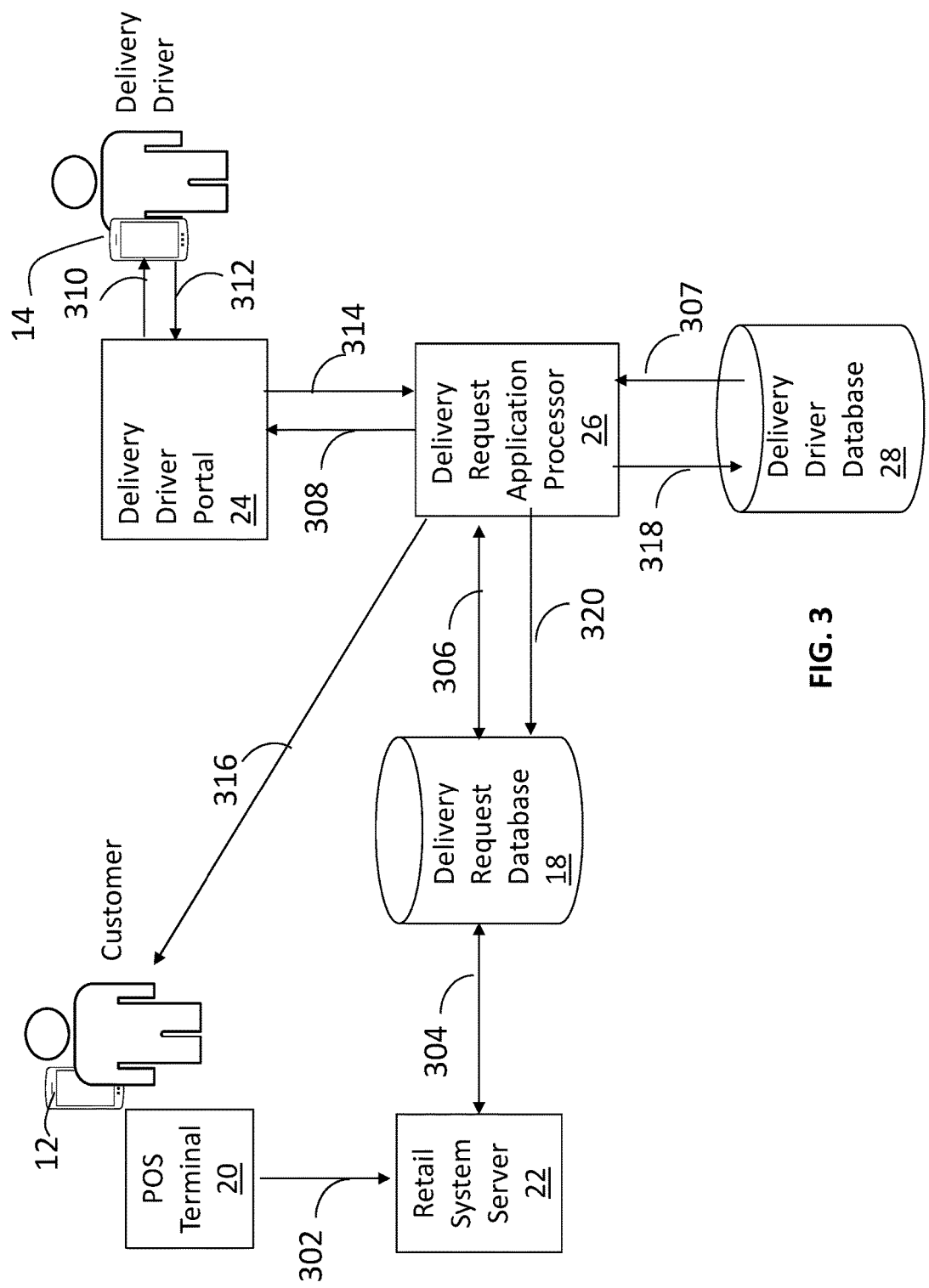
FIG. 3 is a diagram illustrating data exchanges between various elements of a retail environment, in accordance with some embodiments.

FIG. 3 is a diagram illustrating data exchanges between various elements of a retail environment, in accordance with some embodiments. Although FIG. 3 refers to elements of a retail environment illustrated in FIG. 1, other related interactive devices may equally apply.

At step 302, a customer purchases a store item and requests delivery of the item. Here, the customer can check out at the POS terminal 20 in a normal manner, for example, a store associate may scan barcodes on store items, process payment of the item by the customer, and so on. The transaction data is output from the POS terminal 20 to the retail system server 22. The customer also has the option of requesting a delivery driver. In some embodiments, the cashier initiates a request for a delivery driver by entering a phone number or other information that can associate the registered transaction to the mobile device application 13.

At step 304, the retail system server 22 receives from the POS terminal 20 the selected store item data including the delivery request, and generates an entry in the delivery request database 18.

At step 306, the delivery request application processor 26 pulls new requests from the delivery request database 18, and processes the requests. In doing so, the request application processor 26 can calculate delivery costs. Cost of the delivery may be based on the time of day, size of delivery, distance of delivery. The requests from the request database 18 may be compared with available drivers step 307 pulled from the delivery driver database 28 to identify possible drivers who may perform deliveries according to the pulled requests.

In processing the request, the delivery request application processor 26 can rely on the rules engine 202 to establish criteria for the delivery vehicle to be used. For example, a rule can establish that the vehicle for delivery must be less than 10 years old, under 100,000 miles, and so on. Another criterion may be that the vehicle must be a truck having a flatbed of a predetermined size, which can be compared to the size of the item to be delivered in the delivery request.

At step 308, the delivery request application processor 26 publishes a list of requests to the delivery driver portal 24 for each delivery driver, preferably only drivers that qualify to perform a delivery.

At step 310, a delivery driver, or more specifically, a computer having a display, may receive and view information related to a delivery request. In some embodiments, the delivery driver may receive a notification that there are new delivery requests on the delivery driver portal 24. One or more delivery drivers can view a list of outstanding deliveries on the delivery driver portal, and at step 312 a delivery driver can accept a delivery request.

At step 314, the delivery driver portal 24 sends an acceptance by one or more delivery drivers to the delivery request application processor 26. If a single driver acceptance is received, then at step 316 the customer can receive a direct notification. If multiple acceptances are received, then a bidding process may be performed for example by the bid processor 206 to determine which delivery driver acceptance is accepted by the customer.

The delivery request application processor 26 may perform a match between a customer's purchases requiring delivery with a delivery driver to determine whether the driver accepting the delivery request is acceptable. The driver can be validated by determining whether deliver driver data in the database 28 satisfies a set of rule criteria and/or validated by the customer reviewing information on each driver participating in a bidding process.

At step 316, the delivery request application processor 26 directs a notification to the customer, or more specifically, a computer device 12, that the delivery request has been accepted. In some embodiments, the customer can review information on the driver accepting the delivery request such as a driver's driving experience, fees incurred by the driver, accidents and/or citations associated with the driver, and so on. At step 318, a driver may enter information, for example, including driver record information, etc. Driver and/or vehicle information may also be pulled from other sources.

At step 320, the delivery request database 18 may be updated with driver information provided by the delivery request application processor 26. A delivery driver may update information at any time.

As described herein, the delivery request application processor 26 may require information about an item, such as a height, length, width, weight of a large store item, e.g., a television set, refrigerator, and so on. This information may be required to determine whether a driver accepting a delivery request is acceptable, for example, whether the driver's vehicle can safely deliver a particular item purchased by a store customer. In doing so, the item must fit within the dimensions of the vehicle.

In some embodiments, a determination may be made by comparing vehicle information stored at the delivery driver database 28 and item information stored at the retail system server 22. The driver qualification processor 210 may execute this comparison, for example, triggered in response to the POS terminal 20 executing a transaction that includes the purchase of the item of interest. For example, the driver qualification processor 210 may cross-reference a size and weight of an item in a store item record file and the delivery driver database 28 and pair the result with the minimum requirements for delivery of the item.

Figure 4:
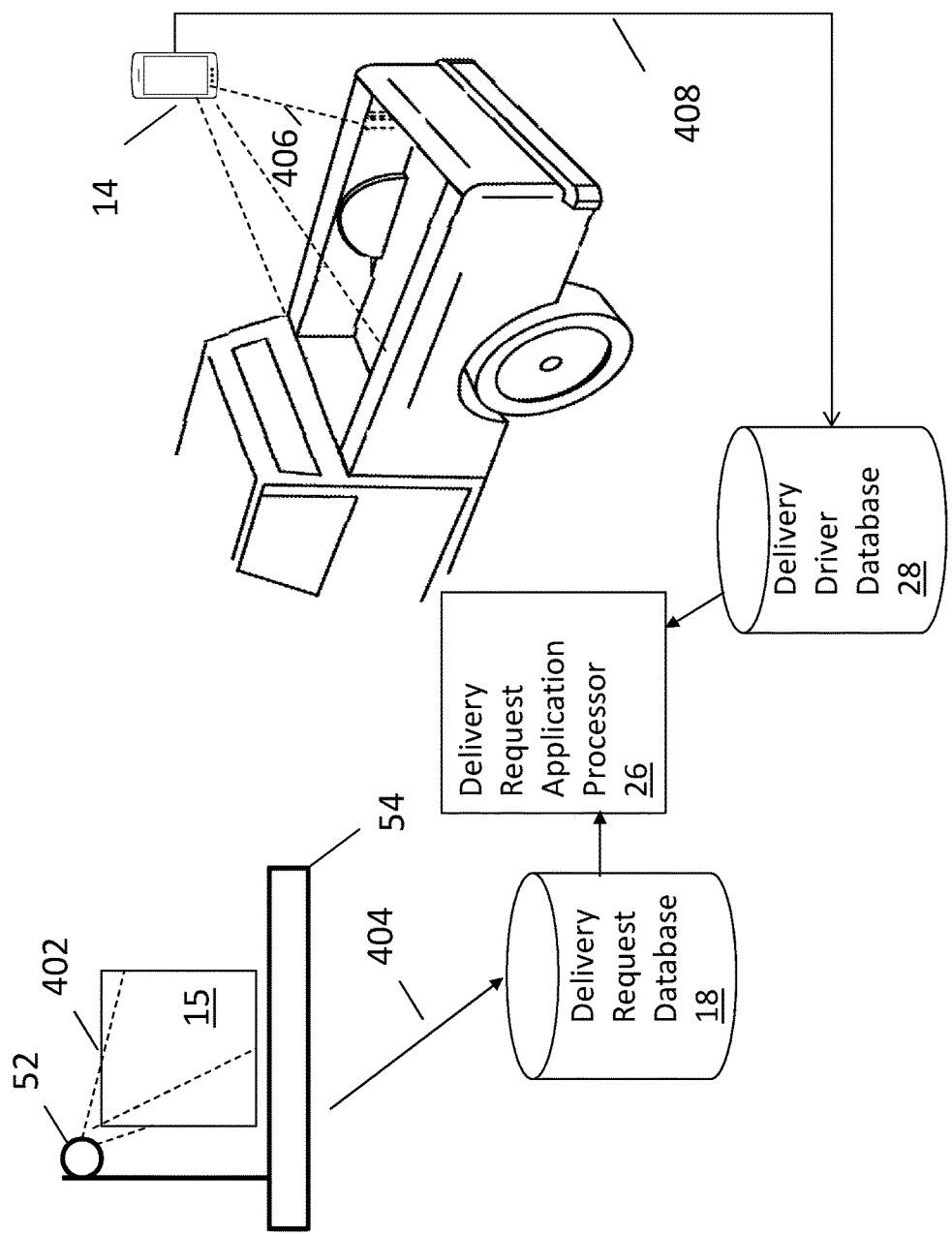
FIG. 4 is a diagram illustrating a measurement collection data exchange for a delivery system, in accordance with some embodiments.

In other embodiments, the vehicle information and/or item information may be not be available. As shown in FIG. 4, in other embodiments, at step 402, a weight scanner 54 may be provided for comparing the weight of a store item 15 for purchase and delivery and a weight capacity of a truck or other vehicle. A camera 52 or other sensor may be used to receive an image of the item 15, which can be used by a processor to determine a size of the item 15. This data may be stored (404) at the retail system server 22, and used for cross-referencing with a size of a truck bed or other space in the vehicle for carrying the item 15. Alternatively or in addition, at step 406, a camera or other sensor, for example, a smartphone 14, may be used to to receive an image of the vehicle, which can be used by a processor to determine a size of the space in the vehicle for carrying the item 15. Other sensors may be used to determine the amount of weight that the vehicle can carry, the amount of compression of the springs capable of supporting the item 15, the size or power of the vehicle engine, and so on. This data may be stored (408) at the delivery driver database 28.

In some embodiments, data may be collected after the item is placed on the vehicle. For example, the smartphone 14 may generate a first image of the vehicle before the item 15 is placed inside it, and generate a second image of the vehicle after the item 15 is placed inside it. The driver qualification processor 210 can process the two images to determine an amount of compression of the truck, and determine whether an amount of compression or sag, for example, due to a decrease in depth of a surface of a vehicle, exceeds a predetermined threshold, for example, a 10% difference, and reject the request by the driver applicant if the determined decrease in depth exceeds the predetermined threshold.

In another example, a sensor may measure the revolutions per minute (RPMs) of the vehicle engine during operation, which may be used to determine an amount of power or force by the vehicle to move the item. Similarly, the driver qualification processor 210 can process "before" and "after" sensor measurements to determine whether an increase in RPMs or other power-related data exceeds a predetermined threshold, to determine whether to accept or reject the request by the driver applicant.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing and other features and advantages of the invention will be apparent to those of ordinary skill in the art from the following more particular description of the invention and the accompanying drawings.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:

1. A system for electronically matching store items and a delivery vehicle for delivering the store items to a selected destination, comprising:
   a store computer that receives selected store item data including a delivery request;
   a delivery request database that stores the delivery request;
   a delivery request application processor that provides a rule that includes criteria for selecting a vehicle of at least one delivery driver capable of delivering a store item under the delivery request and generates a result that identifies a delivery driver of the at least one delivery driver having the vehicle satisfying the criteria of the generated rule;
   at least one sensor that determines at least one of a measurement of a vehicle to be used by the at least one delivery driver or a measurement of a store item, and generates a result which is processed by the delivery request application processor to confirm that the vehicle satisfies the criteria of the generated rule; and
   a delivery driver portal that includes a display for displaying a list of outstanding deliveries and for submitting bids by the at least one delivery driver in response to the delivery request, wherein the delivery request application processor qualifies the at least one driver submitting bids, wherein the at least one sensor collects first vehicle data before the store item is positioned in the vehicle to be used by the at least one delivery driver and collects second vehicle data after the store item is positioned in the vehicle, then generates the result in response to determining whether a difference between the first and second vehicle data exceeds a threshold value, wherein the first and second vehicle data each includes at least one image of the vehicle and where the at least one sensor captures the at least one image of the vehicle to determine an item-carrying capability of the vehicle, and wherein the rule establishes the item-carrying capability.

2. The system of claim 1, wherein available delivery drivers of the at least one delivery driver satisfying the criteria submit the bids from the delivery driver portal to perform a requested delivery.

3. The system of claim 1, further comprising a customer portal that includes information on a delivery driver of the at least one delivery driver satisfying the criteria, and providing to a display a list of qualified delivery drivers for consideration to deliver the store item according to the delivery request.

4. The system of claim 1, further comprising a delivery driver database that stores a list of available delivery drivers for performing the requested delivery.

5. The system of claim 4, wherein the delivery request application processor vets the list of available delivery drivers according to the rule criteria and generates a list of qualified available delivery drivers and wherein the at least one sensor collects the first and second vehicle data of the vehicle to be used by the at least one of the list of qualified available delivery drivers.

6. The system of claim 5, further comprising a bid processor, wherein the qualified available delivery drivers submits from a computer a bid to perform the requested delivery.

7. The system of claim 6, wherein additional information about the qualified available delivery drivers is presented to the customer for selecting a driver from the qualified available delivery drivers.

8. The system of claim 6, wherein the bid processor exchanges data with the rules engine, establishing that a driver submitting a lowest bid is to be awarded the job of performing a delivery in accordance with a delivery request.

9. The system of claim 5, wherein the delivery request application processor automatically generates a selected delivery driver of the list of qualified available delivery drivers.

10. The system of claim 1, wherein the delivery request application processor performs a match between a customer purchases requiring delivery with a delivery driver to identify one or more delivery drivers that satisfy the criteria.

11. The system of claim 1, wherein the criteria includes a bid delta.

12. A method for electronically matching store items and a delivery vehicle for delivering the store items to a selected destination, comprising:

storing selected store item data in a data repository, the selected store item data including a delivery request;

generating, via a processor, a rule that includes criteria for selecting a vehicle of at least one delivery driver capable of delivering a store item under the delivery request;

generating, via a processor, a result that identifies a delivery driver of the at least one delivery driver having the vehicle that satisfies the criteria of the generated rule; and determining by a sensor at least one of a measurement of a vehicle to be used by the at least one delivery driver or a measurement of a store item, and generating a result which is processed by the delivery request application processor to confirm that the vehicle satisfies the criteria of the generated rule, wherein the sensor collects first vehicle data before the store item is positioned in the vehicle to be used by the at least one delivery driver and collects second vehicle data after the store item is positioned in the vehicle, then generates the result in response to determining whether a difference between the first and second vehicle data exceeds a threshold value, wherein the first and second vehicle data each includes at least one image of the vehicle and where the at least one sensor captures the at least one image of the vehicle to determine an item-carrying capability of the vehicle, and wherein the rule establishes the item-carrying capability.

13. The method of claim 12, further comprising providing a customer portal that includes information on the delivery driver submitting the accepted delivery request and receives the accepted delivery request from the delivery driver portal and for accepting the delivery driver submitting the accepted delivery request.

14. The method of claim 13, further comprising storing a list of available delivery drivers for performing the requested delivery, and determining the list of available delivery drivers according to the rule criteria and generates a list of qualified available delivery drivers and wherein the at least one sensor collects the first and second vehicle data of the vehicle to be used by the at least one of the list of qualified available delivery drivers.

15. The method of claim 14, further comprising outputting the qualified available delivery drivers to a bid to identify available drivers to perform the requested delivery.

16. The method of claim 15, wherein additional information about the qualified available delivery drivers is presented to the customer for selecting a driver from the qualified available delivery drivers.

17. A delivery request application device, comprising:

a rules engine that stores a set of criteria, which establishes conditions for selecting at least one delivery driver;

a delivery request processor that processes a delivery request made by a purchaser of a store item;

a delivery factor calculator that establishes a delivery cost of the store item; and driver qualification processor that generates a result that identifies a delivery driver of the at least one delivery driver satisfying the criteria of the generated rule, wherein the delivery request processor further receives a result from a sensor to confirm that the vehicle satisfies the criteria of the generated rule, wherein the delivery request application device qualifies the at least one delivery driver submitting bids, wherein the at least one sensor collects first vehicle data before the store item is positioned in the vehicle to be used by the at least one delivery driver and collects second vehicle data after the store item is positioned in the vehicle, then generates the result in response to determining whether a difference between the first and second vehicle data exceeds a threshold value, wherein the first and second vehicle data each includes at least one image of the vehicle and where the at least one sensor captures the at least one image of the vehicle to determine an item-carrying capability of the vehicle, and wherein the rule establishes the item-carrying capability.

18. The delivery request application device of claim 17 further comprising a bid processor that processes bids to deliver the store item under the conditions by delivery drivers of the at least one delivery driver.

* * * * *